Nov. 15, 1949

H. NELSON 2,488,318

MACHINE FOR FORCING FITTINGS INTO
THE ENDS OF WOODEN BARS

Filed Feb. 27, 1947

INVENTOR
HARRY NELSON
BY
Ramsey, Kent + Chisholm
HIS ATTORNEYS

Patented Nov. 15, 1949

2,488,318

UNITED STATES PATENT OFFICE 2,488,318

MACHINE FOR FORCING FITTINGS INTO THE ENDS OF WOODEN BARS

Harry Nelson, New York, N. Y., assignor to Lorentzen Hardware Mf'g. Corp., New York, N. Y., a corporation of New York Application February 27, 1947, Serial No. 731,393

11 Claims. (Cl. 1—1)

This invention relates to machines for forcing fittings into the ends of wooden members, and more particularly to machines for forcing driven fittings into the ends of wooden Venetian blind bars.

In the manufacture of Venetian blinds, it is desirable to insert fittings of various shapes into the ends of certain of the bars used in the blinds. These fittings are conventionally of driven type, having one or more prongs or legs which may be toothed, barbed, or otherwise roughened to increase their holding ability and are driven into the squared ends of the bars in a direction parallel with the grain.

Such fittings are customarily used for supporting a Venetian blind tilt bar beneath the head bar, a fitting being driven into each end of the tilt bar and engaging a tilter mechanism and a tilt bar bracket, both of which are usually mounted on the underside of a head bar. These fittings usually comprise a round pin for engagement with the tilt bar bracket and a flat or other non-circular fitting for engagement with the tilter, the former being termed in the trade a gudgeon pin, and the latter a connector. While the present invention is suitable for driving other fittings, it has been particularly designed for the driving of such fittings into the ends of Venetian blind tilt bars.

Prior to use of the machine disclosed in Patent No. 2,260,389 of October 28, 1941, issued on the invention of Hans K. Lorentzen, it was very difficult to successfully insert fittings in the ends of wooden bars unless a hole was first made in the ends of the bars for reception of the fittings. The present invention, which is in some respects an improvement over the machine disclosed in the above-mentioned patent, is directed to the improvement of certain structural and operating features of such a machine.

In the form shown, the machine includes a stand for firmly supporting the fitting driving mechanism at a convenient height above the floor. A clamp and suitable guides are provided for clamping a wooden bar in definite position relative to a fitting driving mechanism. The fitting driving mechanism, which includes displaceable supports for guiding a fitting into proper position in the end of the bar, serves to drive the fittings into the ends of tilt bars. Power is supplied for operation of the driving mechanism by a pedal and a toggle joint, toggle joint operation being particularly advantageous in that, as the links of the joint are moved towards alignment, the mechanical advantage of the force applied to the pedal is increased so as to provide for easy fitting driving into the hardest of woods.

A toggle joint is also incorporated in the tilt bar clamp so as to obtain an easier clamping and unclamping action. In addition, cap screws are provided for adjusting this clamp to grip various thicknesses of head bars. Rubber blocks, which are compressed during the clamping action, serve to give some latitude in the adjustment of the clamp so as to give a satisfactory clamping action, and at the same time provide for minor differences in thickness of tilt bars without resort to the adjustment screws.

An object of the present invention is to provide, in a machine of the type described, an improved means for supporting and guiding fittings while being driven into the ends of tilt bars.

A further object is to provide in such a machine an improved operating mechanism so as to facilitate actuation of the fitting driving mechanism.

A further object is to provide an improved clamp for holding bars in position while driving fittings therein.

A further object is to generally improve machines of the type herein described.

A still further object is to provide an improved machine for driving a plurality of differently shaped fittings.

Further objects, and objects relating to details and economies of construction and use will more definitely appear from the detailed description to follow.

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Fig. 18 is a perspective view of a further form of fitting driving head, designed to drive the fittings shown in Figs. 6 and 11a.

Fig. 19 is a left side elevation of the machine.

Fig. 20 is a vertical section of the bar clamp taken generally on the line 20—20 of Fig. 1.

Figures 1, 21:
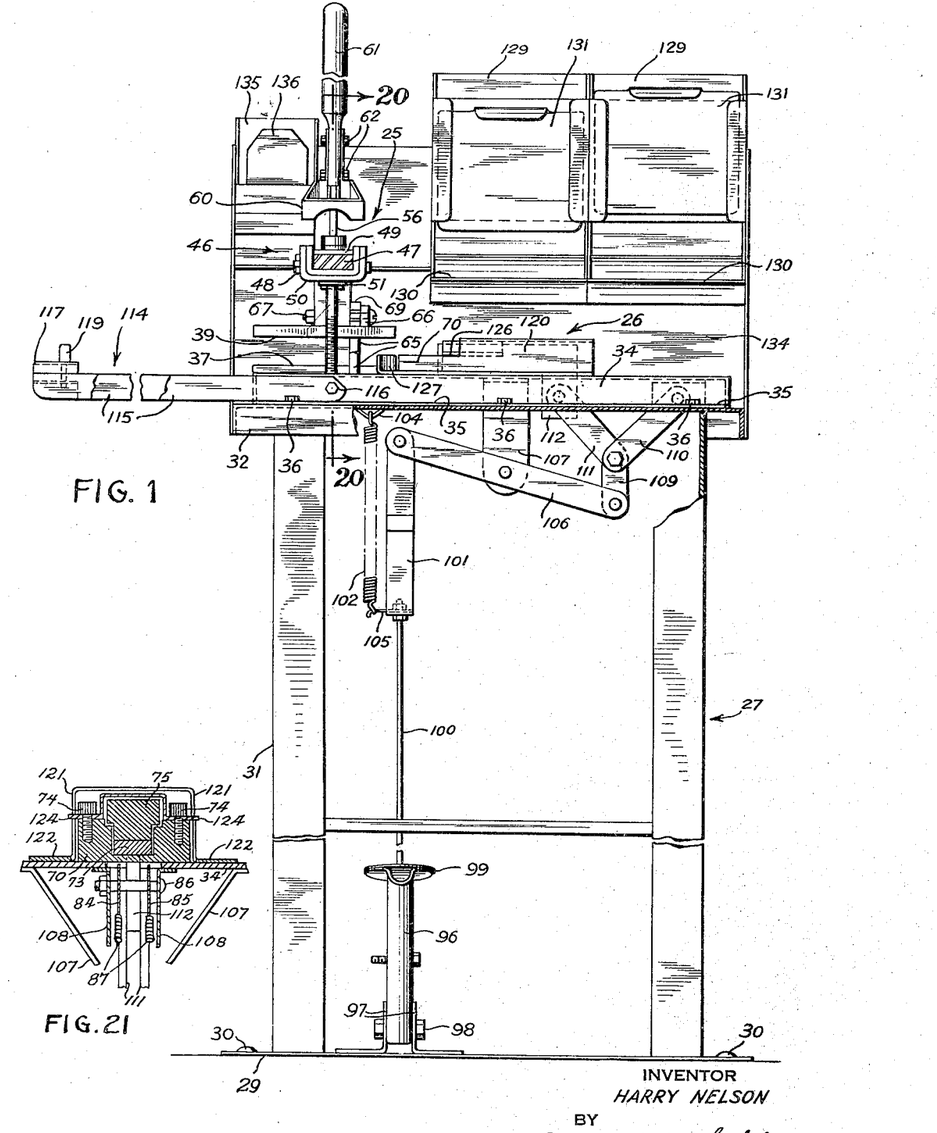
Fig. 1 is a front elevation of a machine constructed in accordance with the present invention, portions of the machine being broken away for convenience of illustration and other portions being shown in section to show details of construction.
Fig. 21 is a fragmentary vertical section taken generally on the line 21—21 of Fig. 2.
Figures 18, 19, 20:
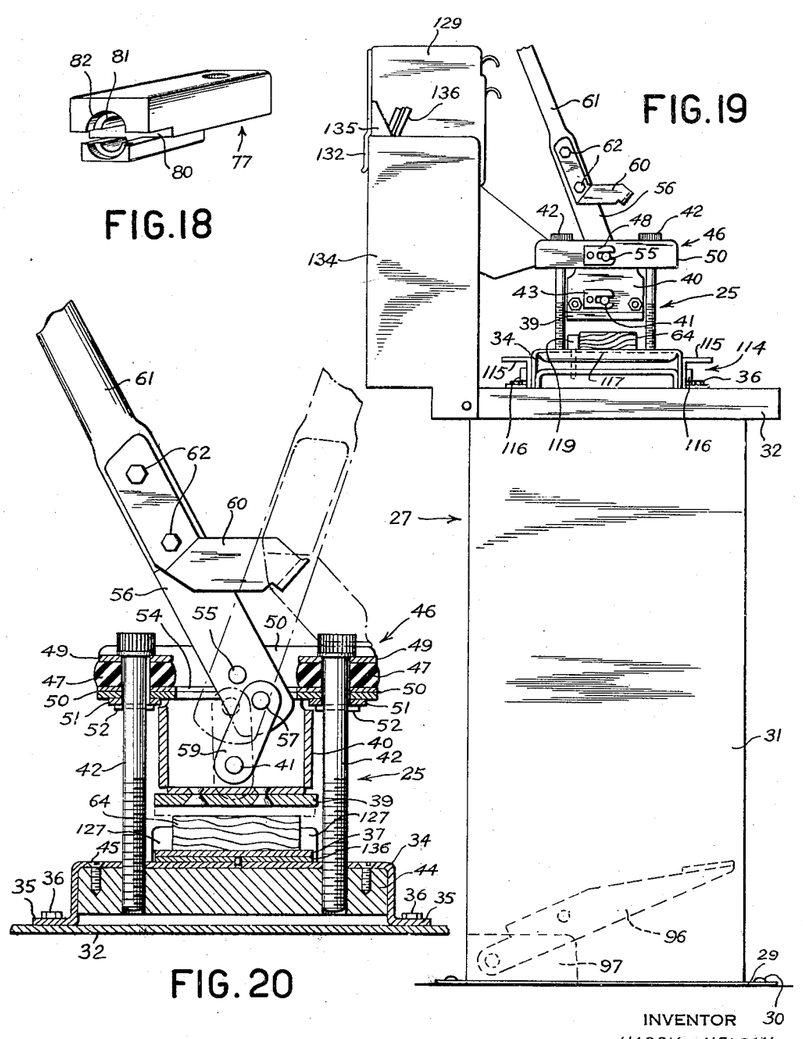

Referring now to the drawings, and particularly to Figs. 1 and 19, the fitting driving machine comprises a tilt bar clamp 25 and a fitting driving mechanism 26 which are supported at a convenient operating height from the floor by a stand 27. The stand 27 is preferably formed entirely of sheet metal of sufficiently heavy gauge for the requisite strength and rigidity. This stand has a base 29 which may be secured to a floor by bolts 30 as indicated. A large vertical channel 31 constitutes the sides and back of the stand 27 and is secured to the base 29 by welding or otherwise. The channel 31 is open at the front, as shown in Fig. 1, and supports a top 32 which is preferably formed with a downwardly-directed marginal flange for increased rigidity. The stand 27 also supports a portion of the operating linkage for the fitting driving mechanism 26, as will be described later.

A frame 34 which is formed by stamping or otherwise from relatively heavy gauge sheet metal has a flat rectangular top surface and a downwardly-directed flange extending around its periphery and terminating in outwardly-directed longitudinal flanges 35 which are adapted to be secured to the top 32 by bolts 36. The frame 34 serves to mount the tilt bar clamp 25 and the fitting driving mechanism 26.

The tilt bar clamp 25 includes a stationary lower clamping member 37 and a movable upper clamping member 39, the upper member being vertically reciprocative between clamped and unclamped position. The upper clamping member 39 is supported by a jaw 40 to which it is firmly attached. The jaw 40 consists of a generally rectangular frame in which a transverse horizontal pivot pin 41 is mounted.

A pair of spaced cap screws 42, 42 positioned in front of and to the rear of the clamping members 37 and 39 form the uprights for the clamp 25. The lower portion of each of these screws is threadedly engaged with a frame reinforcing member 44, which is positioned immediately beneath the frame 34 (see Fig. 20) and is held in position by screws 45. The screws 42, 42 support at their upper ends a horizontal bridge member 46 spanning the space between these screws.

The bridge member 46 is a composite member formed in part of two elastic rubber bushings or pads 47, 47, one pierced by each of the screws 42, 42. Flat steel backing plates 49, 49 are positioned immediately above the pads 47, 47. Immediately below the rubber pads 47, 47 is a channel-shaped plate 50 which may conveniently be formed of two channel-shaped thinner plates that are nested together. This composite plate is best shown in Figs. 1, 19 and 20 and extends from front to rear of the clamp 25, the screws 42, 42 passing through this plate as well as through backing plates 49, 49, respectively.

The horizontal bridge member 46 is normally supported in position on the screws 42, 42 by washers 51, 51, and cotter pins 52, 52 which pass through the screws. This assembly is such that the rubber pads 47, 47 are not compressed when the plate 50 is in normal position.

The plate 50 has a rectangular central opening 54 and mounts a transverse horizontal pivot pin 55 across the opening. A straight clamp operating lever 56 is pivotally mounted for front to rear oscillation on the pin 55 and projects downwardly through the central opening 54 in the plate 50. Below the pin 55, a second pin 57 is journaled in the lever 56. A short link 59 journaled on the pins 57 and 41 connects the lever 56 with the jaw 40 of the upper clamping member, this link preferably being formed of two spaced parallel plates, one positioned on each side of the lever 56. The pins 41 and 55 are anchored against all movement in the jaw 40 and plate 50 respectively by clips 43 and 48 (Fig. 19) mounted on these members and engaging the pins.

The above-described link mechanism forms a toggle joint for reciprocating the upper clamping member 39 between clamped and unclamped position. A toggle joint is of particular advantage for a clamp of this type inasmuch as the mechanical advantage between the force applied to the lever 56 and the force applied by the upper clamping member 39 is continually increased as the pin 57 is moved into alignment between the pins 55 and 41. Thus, the greatest clamping force is obtained when required for the final clamping movement of the clamping member 39.

A lever stop 60 formed of a generally U-shaped sheet metal stamping secured to the lever 56 contacts the top edges of the channel-shaped plate 50 upon forward oscillation of the lever to limit the clamping movement of the lever to that indicated in dot-dash lines in Fig. 20, in which the pin 57 is slightly to the rear of pins 41 and 55. In this position of the lever 56, upward pressure on the clamping member 39 tends to oscillate the upper portion of the lever 56 forwardly, which movement is resisted by the stop 60. In this manner the stop 60 serves to hold the clamp 25 in clamped position against back pressure on the upper clamping member 39. A detachable lever extension 61 is secured in position upon the lever 56 by bolts 62, 62, which also serve to mount the lever stop 60.

The distance between clamping members 37 and 39 may be adjusted by turning the cap screws 42, 42, thus raising or lowering the bridge member 46. To facilitate adjustment of the screws 42, 42, they may be of the type having a knurled cylindrical surface for hand operation and an "Allen" type socket for operation with an "Allen" wrench. When a tilt bar 64 (see Fig. 20) is inserted between the clamping members 37 and 39, and the lever 56 is oscillated forwardly to clamping position, the clamping member 39 will be forced downwardly against the bar provided that the cap screws 42, 42 are properly adjusted. The pressure of this clamping member against the bar 64 reacts against the plate 50 and results in compression of the rubber pads 47, 47, thus giving some latitude in the adjustment of the screws 42, 42, and giving a more uniform clamping pressure. This is of particular advantage inasmuch as there is variation in the thickness of wooden bars of the same nominal size, and this clamp will firmly and uniformly clamp such bars without any special adjustment thereof for individual bars of the same nominal size.

The jaw 40 with its upper clamping member 39 is supported from the cap screws 42, 42 by means of the toggle joint and bridge member 46 above described. This linkage permits a disadvantageous amount of side play in the clamping member so that, if no further support was provided, when the tilt bar 64 is held within the clamp 25 and fittings driven by operation of the driving mechanism 26, the axial thrust on the bar during the driving operation would be initially resisted only by the friction between the tilt bar and the lower clamping member 37, the upper clamping member 39 being free to move with the bar for a short distance.

This lateral movement of the member 39 is prevented by vertical guides 65, 65 (Figs. 1 and 3) which are formed of round steel rods secured in the frame reinforcing member 44 and projecting upwardly parallel to the cap screws 42, 42. A cooperating bar 66 is secured in horizontal position to the jaw 40 of the upper clamping member by a pair of nuts and bolts 67, 67. Spacers 69, 69 between the bar 66 and the jaw 40 serve to hold the bar in correct position relative to the guides 65, 65. This guide assembly prevents movement of the jaw 40 with its upper clamping member 39 to the left as viewed in Fig. 1, thus permitting both clamping members to initially oppose the thrust on bar 64 resulting from the fitting driving operation. This allows a secure holding of such bars with less clamping pressure, thus resulting in prolonged life of the machine and preventing marring of the surface of bars.

The fitting driving mechanism 26, which is also mounted on the frame 34, is positioned opposite the tilt bar clamp 25. This mechanism has a pair of guide rails 70, 70 (Fig. 2) mounted on the top surface of the frame. These guide rails, together with the top surface of the frame 34 and a top guide member 71, form a channel lying along the center line of the frame and directed towards the center line of the tilt bar clamp 25. The guide rails 70, 70 and top guide member 71 are held in assembled position on the frame 34 by bolts 74.

Figure 9:
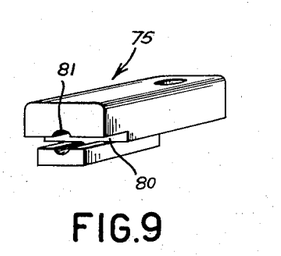
Fig. 9 is a perspective view of a form of fitting driving head designed to drive not only the fitting shown in Figs. 2 and 3 but also the fitting shown in Fig. 6.

A fitting driving member 72 of generally rectangular cross section is mounted for reciprocation along this channel. The fitting driving member 72 has a stepped end 73 (see Fig. 3) for receiving a fitting driving head, such as heads 75, 76 and 77 shown in Figs. 9, 13 and 18, respectively. These fitting driving heads differ in that each is adapted and shaped for the driving of specific fittings. The driving head 75 of Fig. 9 is adapted for the driving of the connector 92 shown in Fig. 6, which is generally similar to the connector shown and described in Patent No. 2,120,284 of June 14, 1938, issued to Hans K. Lorentzen. This same driving head also serves to drive the gudgeon pin 93 shown in position in the machine in Fig. 2 and also shown in Fig. 10a.

Figure 11A:
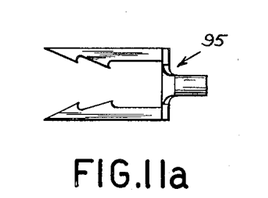
Fig. 11a is a plan view of another form of fitting.
Figure 12:
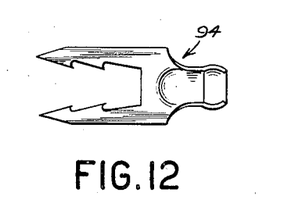
Fig. 12 is a plan view of a further form of fitting.
Figure 13:
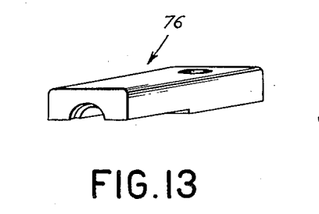
Fig. 13 is a perspective view of a form of fitting driving head designed to drive the fittings shown in Figs. 11a and 12.
Figure 14:
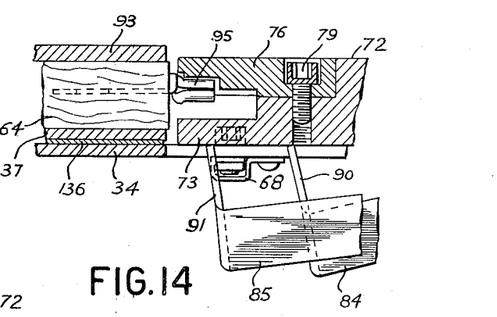
Fig. 14 is fragmentary vertical section generally similar to Fig. 8 showing a fitting of the type shown in Fig. 11a in driven position.
Figure 15:
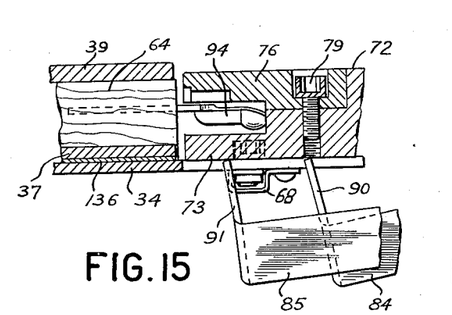
Fig. 15 is a view generally similar to Fig. 14, showing a fitting of the type shown in Fig. 12 in driven position.
Figure 16:
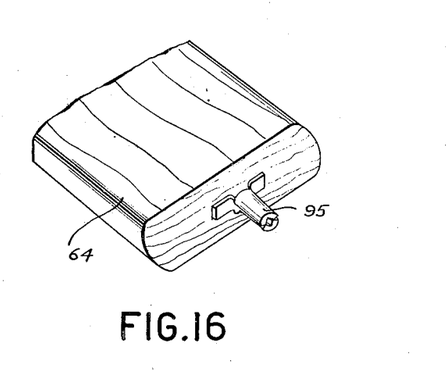
Fig. 16 is a perspective view of an end of a tilt bar having a fitting of the type shown in Fig. 11a driven therein.
Figure 17:
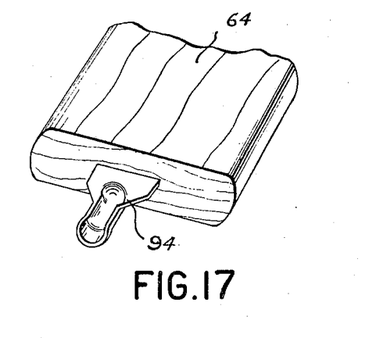
Fig. 17 is a perspective view of the opposite end of the tilt bar shown in Fig. 16 having a fitting of the type shown in Fig. 12 driven therein.

The driving head shown in Fig. 13 serves to drive the connector 94 shown in Fig. 12, which is generally similar to that shown and described in Patent No. 2,269,213, of January 6, 1942, issued to Hans K. Lorentzen, and the gudgeon pin 95 shown in Fig. 11a. The driving head 77 shown in Fig. 18 is particularly shaped for driving the fittings 92, 93 and 95 shown in Figs. 6, 11 and 11a respectively.

The fitting driving heads 75, 76, and 77 are selectively secured to the forward end of the fitting driving member 72 by a cap screw 79 of the "Allen" type recessed in the driving head and threadedly engaging the driving member, thus providing for easy interchange of driving heads. Each of these driving heads is adapted for the driving of at least one type of connector and one type of gudgeon pin so that it is unnecessary to change driving heads in order to drive the fittings required on both ends of a tilt bar 64.

Each of the driving heads 75, 76 and 77 has a forward end particularly adapted for the fittings which it is intended to drive. The heads shown in Fig. 9 and Fig. 18 have a horizontal slot 80 and bores 81 and 81a, respectively, these configurations aiding in the guiding of the particular fittings for use with which they are intended during the driving operation. In addition, the head 77 of Fig. 18 is provided with a somewhat larger counterbore 82 to provide necessary clearance for the fitting 95 with which it is intended to be used. The head 76 shown in Fig. 13 is generally similar to the head 77, except that the lower portion is omitted to provide necessary clearance for receiving the fittings which it is intended to drive.

Figures 3, 4:
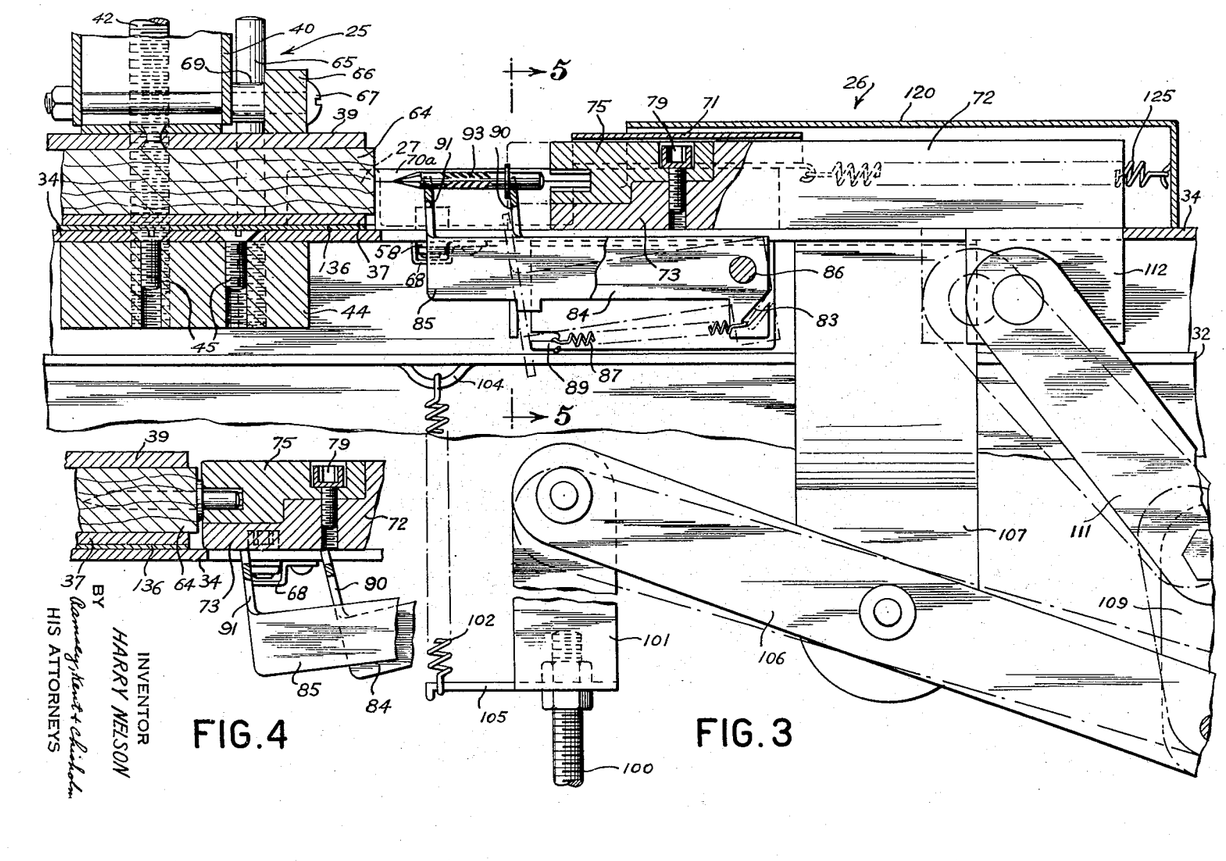
Fig. 3 is a vertical section of the machine taken generally on the line 3—3 of Fig. 2 and showing a fitting positioned for driving into the end of a tilt bar.
Fig. 4 is a fragmentary section similar to Fig. 3 of a portion of the mechanism shown therein, the fitting having been driven into the end of the tilt bar.
Figures 5, 6, 7:
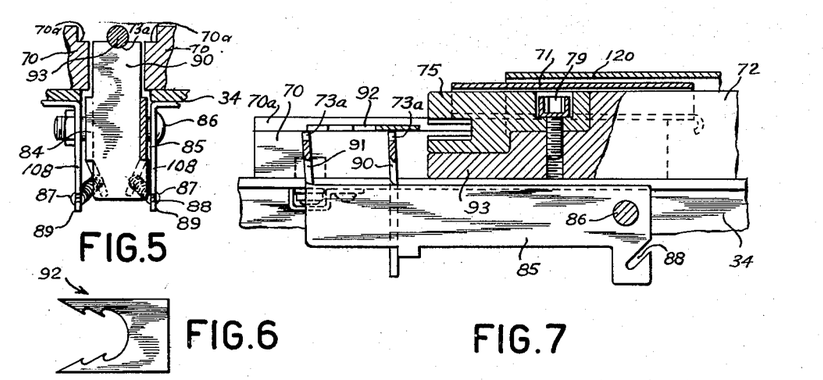
Fig. 5 is fragmentary vertical section taken generally on the line 5—5 of Fig. 3, the view showing one of the fitting supports in end elevation and a fitting in supported position thereon.
Fig. 6 is a plan view of one form of fitting.
Fig. 7 is a fragmentary vertical section similar to a portion of Fig. 3 showing the fitting of Fig. 6 in position for driving.
Figure 8:
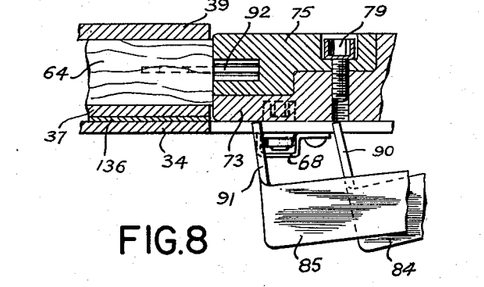
Fig. 8 is a view similar to Fig. 7 but with the parts in the position they occupy upon completion of the fitting-driving movement.
Figures 10, 10A, 11:
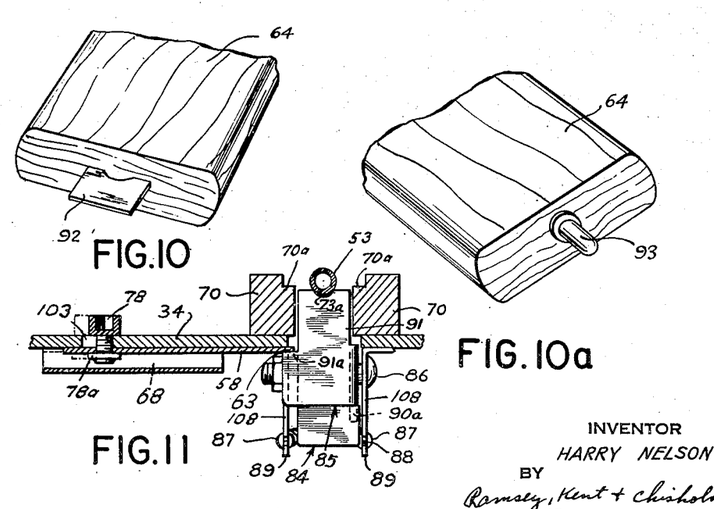
Fig. 10 is a perspective view of an end of a tilt bar having a fitting of the type shown in Fig. 6 driven therein.
Fig. 10a is a perspective view of the opposite end of the tilt bar shown in Fig. 10, a fitting of the type shown in Figs. 2 and 3 being shown driven therein.
Fig. 11 is a fragmentary vertical section taken generally on the line 11—11 of Fig. 2, a differently shaped fitting being shown in position on the fitting supports than that shown in Fig. 2.

Fitting supports designated as a whole by 84 and 85 are initially interposed between the end of the tilt bar 64 and the fitting driving member 72 and, in part, lie within the channel formed by the guide rails 70, 70. These fitting supports, which are best shown in Figs. 3, 4 and 5 serve to properly position a pin-like fitting (e. g. such as 53 and 93) for driving into the end of the tilt bar 64. These supports also support the fitting in position to be engaged by the driving heads 75, 76 or 77. Figs. 3, 5 and 11 show such fittings so positioned by the supports 84 and 85 prior to the driving operation.

The fitting supports 84 and 85 are pivotally mounted on a horizontal transverse pin or bolt 86 supported by a centrally mounted channel 108 on the underside of the frame 34. The channel 108 is shown in Figs. 5 and 11 as having outwardly-directed legs, but this channel may be of inverted U shape if desired. These supports which are formed of generally L-shaped sheet metal stampings are biased clockwise into the position shown in Fig. 3 by tension springs 87, 87 (see Figs. 3 and 5) connected between depending stationary abutments 89, 89 of the channel sides 108, 108 and slots 83 (Fig. 3) and 88 (Fig. 7) formed in the supports 84 and 85, respectively, a short distance below the pin 86.

When the fitting supports 84 and 85 are in normal position substantially vertical upwardly-projecting tongues 90 and 91, respectively, are positioned within the channel formed by the guide rails 70, 70 (Fig. 2) and between the clamp 25 and the driving member 72. These tongues, which lie in planes generally perpendicular to the body portions of the supports, are square across the top except for a central semicircular groove 73a, as shown in Figs. 5 and 11.

These supports will support in a level position within the grooves 73a, 73a fittings such as the gudgeon pin 93 shown in Figs. 3 and 10a.

A hollow gudgeon pin of somewhat greater diameter, such as the fitting 53 of Fig. 11 may also be supported by the fitting supports 84 and 85. The fitting 53 will not lie in the bottom of the grooves 73, 73 of these supports due to its larger diameter, and likewise, its axis will be somewhat above that of the gudgeon pin 93 when similarly positioned. To render the height of the axis of the fitting 53 similar to that of gudgeon pin 93 so as to permit its being driven into the tilt bar 64 at the proper elevation, a shim 58 may be provided and the fitting supports 84 and 85 be so constructed and arranged in conjunction therewith as to prevent the fitting supports from rising to the full extent of their normal travel when a fitting of this nature is being driven; see Figs. 2, 3, 5 and 11.

The shim 58 is reciprocated in a channel 68 mounted on the underside of the frame 34. A bolt 78 of the "Allen Head" type passing through a slot 103 in the frame 34 and through the outer end of the shim 58 is engaged in a nut 78a, this nut being preferably rectangular and secured against turning by engagement with the sides of the channel 68. After loosening the bolt 78, the shim 58 may be reciprocated into or out of engagement with the fitting support 85 by reciprocation of the bolt in the slot 103, after which the bolt may be retightened to clamp the shim in selected position. As seen in Fig. 11, the fitting support 85 has a step formation at 91a which is adapted to engage the end of shim 58 to prevent this support from rising to its full height. At 90a fitting support 84 has a step formation which engages beneath support 85, and therefore the upward movement of support 84 is arrested in conformity with the uppermost position which shim 58 permits for fitting support 85.

Each of the guide rails 70, 70 has an inwardly-directed rabbet 70a (Fig. 11) to form a track for the fittings 92, 94 and 95, each of which has flat generally parallel prongs. These fittings are of uniform width so as to fit between the vertical walls of the rabbet formation 70a, 70a, the fittings resting on the horizontal surfaces of the rabbets 70a, 70a. Accordingly, the fitting supports 84 and 85, together with the rabbeted guide rails 70, 70, will position any fitting herein shown at a particular height and guide it axially forwardly during the driving operation.

The fitting supports 84 and 85 are successively oscillated counterclockwise, as viewed in Fig. 3, to the position shown in Fig. 4, against the bias of the springs 87, 87. This successive movement of the supports 84 and 85 is caused by pressure on the tongues 90 and 91 of the supports by the forward surface of the driving member 72 as it moves forwardly during the driving operation, oscillating the supports on pin 86. This arrangement serves to remove the supports from the path of the driving member as it moves forwardly in driving a fitting.

The fitting driving member 72 is reciprocated within the guide rails 70, 70 by a mechanical linkage. This linkage includes a pedal 96 which is pivotally connected by a nut and bolt 98 to the ears 97, 97 secured to the rear of the base 29, as shown in Fig. 1. The pedal 96 is provided with an enlarged forward foot-engaged portion 99. A vertical rod 100 is pivotally connected to the pedal 96 a short distance in front of the bolt 98 and leads generally vertically upward, terminating in a flat U-shaped stamping 101. A tension spring 102, connected at one end to a bail 104 struck from the undersurface of the top 32 and connected at the other end to the stamping 101 by a projection 105, maintains this stamping, along with rod 100 and pedal 96, normally in raised position, as shown in Fig. 1.

A transverse link 106 is pivotally mounted at its mid-portion on an ear 107 projecting downwardly from the top 32. The link 106 is pivotally connected at one end to the top of stamping 101, and at the other end to a short vertical link 109. The vertical link 109 has its opposite end pivoted to a pair of links 110 and 111, the links 110 and 111 forming a toggle joint as will be explained.

The opposite end of the link 110 is pivoted to the frame 34, while the opposite end of the link 111 is pivoted to a lug 112 projecting downwardly from the rear end of the driving member 72, the frame 34 being longitudinally-slotted to receive this lug and to permit its reciprocation.

The links 106, 110 and 111 are each formed of two flat, spaced parallel plates in order to provide balanced loads upon the pivotal connections, so as to prevent excessive wear at these points and make the machine easier to operate.

The above-described linkage, including pedal 96 and rod 100, form the operating mechanism for forcing the driving member 72 towards the tilt bar clamp 25 in order to drive the fittings. The pedal 96 serves as a lever to increase the mechanical advantage on the rod 100 of the force exerted by the operator. The toggle joint formed by links 110 and 111 serves to further increase this mechanical advantage. In this connection, it will be noted that, as the links 110 and 111 move into horizontal alignment, the mechanical advantage continually and indefinitely increases.

This is of particular value in that at the start of the driving operation little force is required, and quick operation, rather than increased mechanical advantage, is desirable. As the fitting is forced into the end of the bar 64, it encounters increasing resistance caused by displacement of fibers of the wood as it is penetrated. This increasing resistance requires an increased mechanical advantage in order to secure easy operation of the machine. There is a further advantage in the arrangement shown, in that when the links 110 and 111 are forced into alignment, they are also aligned with the direction of travel of the driving member 72, thus minimizing friction between the driving member and its guide rails and providing for easy operation of the machine.

Guides are provided for definitely positioning the tilt bar 64 within the clamp 25. These guides are basically generally similar to those shown in Patent No. 2,260,389, above mentioned. A guide 114 extends to the left of the frame 34, as viewed in Fig. 1. This guide has a pair of spaced legs 115, 115 which are pivotally connected to the downwardly-directed longitudinal flanges of the frame 34 by cap screws 116, 116 engaged in the frame reinforcing member 44. The legs 115, 115 are maintained in horizontal position by engagement with the flanges 35, 35 of the frame when the guide 114 is extended to operating position. During shipment, or when the machine is not being used, the lever extension 61 may be removed and the guide 114 folded over on the balance of the machine.

A transverse member 117 connects the legs 115, 115 at their outer ends and has a plurality of spaced holes for the reception of a guide pin 119. The guide pin 119 is positionable in the holes formed in the member 117 so as to adjust the guide for positioning different widths of bars, as will be explained.

A second guide 120 cooperates with the guide 114 in correctly locating bars in the clamp 25. This guide consists of a stamped housing which covers the driving member 72 and its associated guide rails 70, 70. The guide 120 is provided with a pair of depending flanges 121, 121 positioned immediately outside of the guide rails, these depending flanges terminating in outwardly directed flanges 122, 122. The guide 120 is free to reciprocate along the outside of guide rails 70, 70 and is retained in position thereon by tongues 124, 124 laterally extending from the top guide member 71 near its forward portion and lying above the depending flanges 121, 121.

The guide 120 is biased forwardly towards the tilt bar clamp 25 by a tension spring 125 (Figs. 2 and 3) connected between the rear end of the guide 120 and the rear end of the driving member top guide 71. The guide 120 may be removed for disassembly or maintenance of the machine by moving it against the bias of the spring 125 until a pair of notches 126, 126 formed in the depending flanges 121, 121 and flanges 122, 122 are positioned below the tongues 124, 124 of the guide 71 (Figs. 2 and 21), after which the guide may be raised vertically from assembled relation with the guide rails 70, 70.

Figure 2:
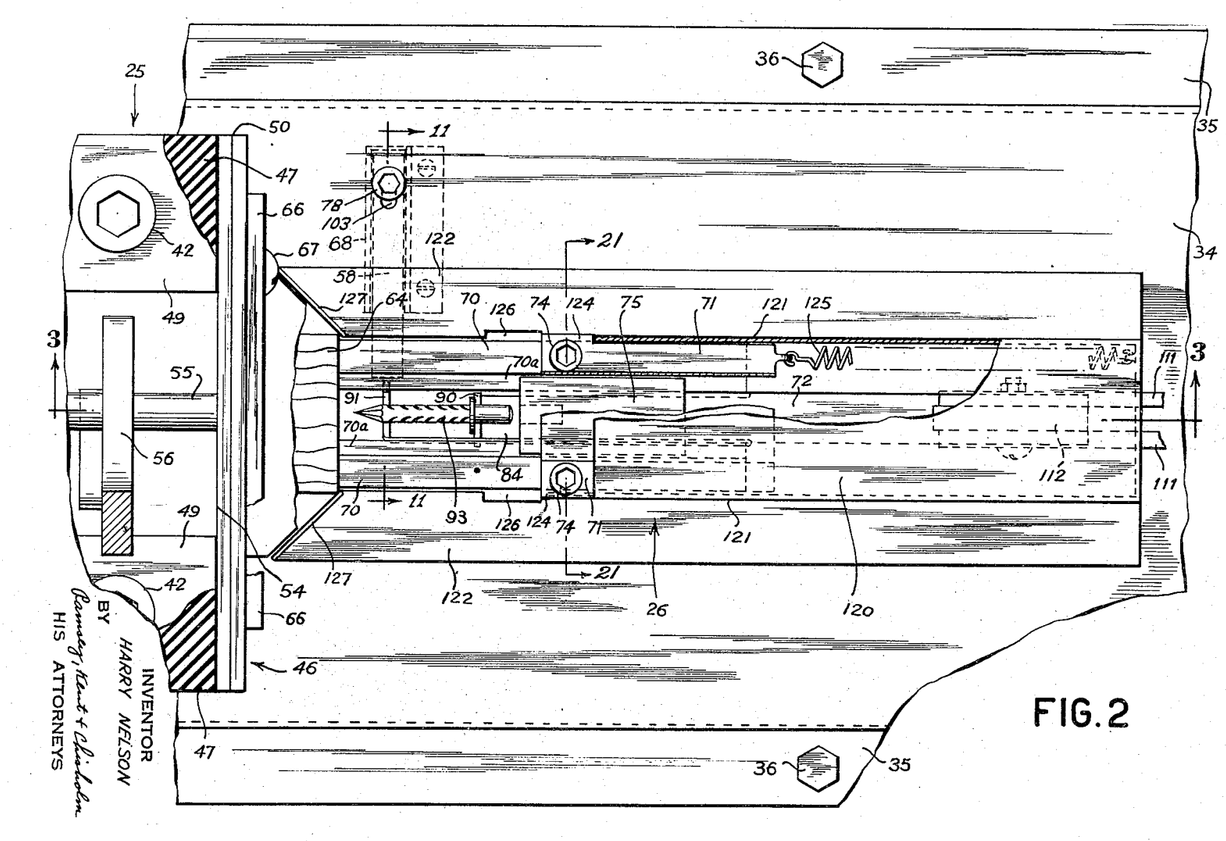
Fig. 2 is a top plan view of a portion of the machine, showing details of the fitting driving mechanism, portions of certain members being broken away or shown in section to show details of construction. A fitting is shown in position for driving into an end of a tilt bar.

The outwardly-directed flanges 122, 122 of the guide 120 terminate forwardly, as best shown in Fig. 2, in a pair of vertical, equally divergent flanges 127, 127. These flanges serve to center the end of a tilt bar 64 pressed against them so as to aid in definitely positioning the bar in the clamp 25.

For convenience, bins 129, 129 (Figs. 1 and 19) may be provided for holding a supply of fittings in a position conveniently accessible to the operator of the machine. Each bin 129 is preferably formed of a light sheet metal stamping having an open top and an open, forwardly-extending tray 130. A slidably mounted plate 131 serves to adjust the opening between each bin 129 and its tray 130 so that the fittings will feed outwardly into the tray to replace those withdrawn therefrom by the machine operator.

The bins 129, 129 are conveniently supported by spaced downwardly-directed tongues such as 132 (one shown) (see Fig. 19) extending from their back sides and hooked over the upper edge of a vertical rack 134. The rack 134 is secured so as to project upwardly from the rear edge of the top 32. A somewhat smaller bin 135 may also be provided on the rack 134 for holding the driving heads 75, 76 and 77 when not in use, together with an "Allen" type wrench and shims 136 for the clamp 25.

In the operation of the machine, a bar such as the tilt bar 64 is placed within the clamp 25. Since it is usually desired to drive tilt bar fittings along the center line of the bar, it is necessary to adjust the clamp 25 and the guide 114 to accomplish this. Shims 136 of varying thicknesses may be positioned between the lower clamping member 37 and the frame 34 to raise the clamping surface of the member 37 so as to raise the center line of the bar to a point level with a fitting supported on the fitting guides 84 and 85. The clamping member 37 is raised higher for thinner bars in order to secure proper alignment.

The pin 119 of the guide 114 is adjusted in accordance with the width of the bar in order to make the center line of the bar coincide horizontally with the center line of the fitting to be driven. For wider bars the pin 119 will have to be set further back. As above mentioned, a plurality of spaced holes have been provided to receive this pin to allow for proper adjustment thereof.

The guide 120 will automatically center the end of a bar forced against the divergent flanges 127, since these flanges diverge at equal angles. Accordingly, when positioning a bar within the clamp 25, an end of the bar is forced against the flanges 127 and the rear edge of the bar is held snugly against the pin 119, the bar resting upon the lower clamping member 37 and the transverse member 117 of the guide 114. The bar is then pushed to the right of the machine as viewed in Fig. 1 so as to force the guide 120 backward against the bias of the spring 125 until the end of the bar contacts the forward ends of the driving member guide rails 70, 70. When the bar has been positioned in this manner the center line of the bar substantially coincides with the center line of a fitting supported on the fitting supports 84 and 85 or on the rabbets 70a, 70a.

After the bar 64 has been positioned as above described it is clamped by oscillating the lever 56 forwardly, thus moving the upper clamping member 39 into clamping position as above described, in which position the rubber pads 47, 47 are somewhat compressed. As above mentioned, adjustment of the clamp 25 for clamping head bars of different thicknesses is secured by turning the cap screws 42, thus raising or lowering the bridge member 46.

After the bar 64 has been secured in proper position in the clamp 25, the fitting to be driven is positioned on the fitting supports 84 and 85, or on the rabbets 70a, 70a, with the bar engaging prongs directed towards the bar. Depression of the pedal 96 forces the fitting driving member 72 to the left as viewed in Fig. 1 so as to drive the fitting into position in the bar. After releasing the pedal, the bar can be unclamped, turned end for end and reclamped, after which the appropriate fitting for the other end of the bar may be driven. The clamp 25 not only serves to hold the bar 64 in the position determined by the guides 114 and 120, but also, due to the pressure exerted on the top and bottom of the bar, serves to prevent splitting of the bar by the fitting during the driving operation.

This machine has been described in conjunction with the driving of fittings into the ends of Venetian blind tilt bars. It is of equal applicability for the driving of fittings into the ends of Venetian blind bottom bars, such fittings often being used to engage hold-down brackets as is well-known in the art.

I claim:

1. In a machine for driving fittings into the ends of Venetian blind bars, a clamp for holding a bar, supporting means for holding a fitting in position for driving into an end of the bar, and means for driving the fitting into the bar, said fitting supporting means comprising a pair of pivotally mounted fitting supports adapted to be successively oscillated downwardly from fitting supporting position by the fitting driving means during its driving movement.

2. In a machine for driving fittings into the ends of Venetian blind bars, a clamp for holding a bar, supporting means for holding a fitting in position for driving into an end of the bar, and means for driving the fitting into the bar, said fitting supporting means comprising a pair of fitting supports pivotally mounted on a common horizontal axis and adapted to be successively oscillated downwardly from fitting supporting position by the fitting driving means during its driving movement.

3. In a machine for driving fittings into the ends of Venetian blind bars, means for clamping a bar, means for supporting a fitting in position for driving into an end of the bar, and means for driving the fitting into the bar in a single driving movement, said fitting supporting means comprising a pair of fitting supports adapted to be successively engaged and displaced downwardly from fitting supporting position by the fitting driving means during its driving movement.

4. In a machine for driving fittings into the ends of Venetian blind bars, a clamp for holding a bar, a pivotally mounted support for holding a fitting in position for driving into an end of the bar, and means for driving the fitting into the bar, said fitting support comprising a pivotally mounted member adapted to be displaced downwardly from fitting supporting position during driving movement of the fitting driving means.

5. In a machine for driving fittings into the ends of Venetian blind bars, means for clamping a bar, means for supporting a fitting in position for driving into an end of the bar, and means for driving the fitting into an end of the bar, said fitting supporting means comprising a pair of fitting supports adapted to be successively displaced downwardly from fitting supporting position during driving movement of the fitting driving means.

6. In a machine for driving fittings into the ends of Venetian blind bars and having means for holding a bar, the combination of a fitting driver reciprocally mounted for driving movement and having a head recessed to receive a fitting to be driven and a pair of fitting supports interposed between the bar holding means and adapted to be successively displaced downwardly by the fitting driver during its driving movement.

7. In a machine for driving fittings into the ends of Venetian blind bars and having means for holding a bar, the combination of a fitting driver reciprocatively mounted for driving movement toward the bar, and a fitting support mounted below the path of driving movement of the fitting driver and having a fitting supporting portion interposed between the bar holding means and the fitting driver, the fitting support being displaced downwardly during driving movement of the fitting driver.

8. In a machine for driving fittings into the ends of Venetian blind bars, a fitting driver oscillatable for fitting-driving movement, guides for the fitting driver, a support for a bar, a clamp for the bar, and a housing for the fitting driver and guides, said housing having equally divergent end surfaces for centering the end of a bar relative to the fitting driver.

9. In a machine for driving fittings into the ends of Venetian blind bars, a fitting driver oscillatable for fitting-driving movement, guides for the fitting driver, a support for a bar, a clamp for the bar, and a housing for the fitting driver and guides, said housing being oscillatably mounted for movement in the direction of the fitting driver and being biased toward the clamp and having equally divergent vertical end flanges adjacent the clamp for centering the end of a bar relative to the fitting driver.

10. A machine for driving fittings into the ends of Venetian blind bars, comprising: fitting-driving means, means for holding a Venetian blind bar against longitudinal movement with an end thereof facing toward and spaced from the driving means, a fitting support biased into position between the fitting-driving means and the end of the bar, and means for variably limiting the biased movement of the fitting support to adapt it for supporting different fittings.

11. A machine for driving fittings into the ends of Venetian blind bars, comprising: fitting-driving means, means for holding a Venetian blind bar against longitudinal movement with an end thereof facing toward and spaced from the driving means, a fitting support biased into position between the fitting-driving means and the end of the bar, and means selectively engageable with the fitting support to limit its biased movement and thereby adapt the support for supporting a different fitting.

HARRY NELSON.

REFERENCES CITED

The following references are of record in the file of this patent:

UNITED STATES PATENTS

| Number | Name | Date |
|---|---|---|
| 680,656 | Gray | Aug. 13, 1901 |
| 1,125,574 | Luppert | Jan. 19, 1915 |
| 1,271,792 | Standish | July 9, 1918 |
| 1,753,425 | MacDonald | Apr. 8, 1930 |
| 2,260,389 | Lorentzen | Oct. 28, 1941 |
| 2,326,293 | Gast | Aug. 10, 1943 |